(12) United States Patent
Yamashita et al.

(10) Patent No.: US 12,555,356 B2
(45) Date of Patent: Feb. 17, 2026

(54) COMPUTER VISION SYSTEM, COMPUTER VISION METHOD, COMPUTER VISION PROGRAM, AND LEARNING METHOD

(71) Applicants: RAKUTEN GROUP, INC., Tokyo (JP); CHUBU UNIVERSITY EDUCATIONAL FOUNDATION, Kasugai (JP)

(72) Inventors: Takayoshi Yamashita, Kasugai (JP); Hironobu Fujiyoshi, Kasugai (JP); Tsubasa Hirakawa, Kasugai (JP); Mitsuru Nakazawa, Tokyo (JP); Yeongnam Chae, Tokyo (JP); Bjorn Stenger, Tokyo (JP)

(73) Assignees: RAKUTEN GROUP, INC., Tokyo (JP); CHUBU UNIVERSITY EDUCATIONAL FOUNDATION, Aichi (JP)

( * ) Notice: Subject to any disclaimer, the term of this patent is extended or adjusted under 35 U.S.C. 154(b) by 286 days.

(21) Appl. No.: 18/580,609

(22) PCT Filed: Mar. 28, 2022

(86) PCT No.: PCT/JP2022/014991
§ 371 (c)(1),
(2) Date: Jan. 19, 2024

(87) PCT Pub. No.: WO2023/187899
PCT Pub. Date: Oct. 5, 2023

(65) Prior Publication Data
US 2024/0338930 A1    Oct. 10, 2024

(51) Int. Cl.
*G06V 10/00* (2022.01)
*G06N 3/02* (2006.01)
(Continued)

(52) U.S. Cl.
CPC ............ *G06V 10/771* (2022.01); *G06N 3/02* (2013.01); *G06V 10/7715* (2022.01); *G06V 20/42* (2022.01)

(58) Field of Classification Search
CPC ...... G06N 3/045; G06N 3/0464; G06N 3/044; G06N 20/00; G06V 10/82; G06V 20/41;
(Continued)

(56) References Cited

U.S. PATENT DOCUMENTS

| 11,715,486 B2 * | 8/2023 | Sainath | G06N 3/044 |
| | | | 706/22 |
| 2009/0092313 A1 * | 4/2009 | Negi | G06F 18/214 |
| | | | 382/160 |

(Continued)

OTHER PUBLICATIONS

Baccouche, Moez, Franck Mamalet, Christian Wolf, Christophe Garcia, and Atilla Baskurt. "Action classification in soccer videos with long short-term memory recurrent neural networks." In International Conference on Artificial Neural Networks, pp. 154-159. 2010.*

(Continued)

*Primary Examiner* — Li Liu
(74) *Attorney, Agent, or Firm* — HEA Law PLLC

(57) ABSTRACT

A computer vision system, with at least one processor configured to: acquire, from a sports match video, a plurality of pieces of consecutive image data indicating a portion of the sports match video, the plurality of pieces of consecutive image data including a plurality of pieces of first consecutive image data that are consecutive; and execute an estimation, by using a machine learning model, of whether the portion is of a predetermined scene type.

12 Claims, 8 Drawing Sheets

(51) Int. Cl.
  *G06V 10/77* (2022.01)
  *G06V 10/771* (2022.01)
  *G06V 20/40* (2022.01)

(58) Field of Classification Search
  CPC ...... G06V 10/462; G06V 20/42; G06V 20/44; G06T 7/00; G06T 2207/10016
  See application file for complete search history.

(56) References Cited

U.S. PATENT DOCUMENTS

| | | | |
|---|---|---|---|
| 2017/0262996 A1* | 9/2017 | Jain | G06N 3/044 |
| 2018/0330183 A1* | 11/2018 | Tsunoda | G06F 18/2148 |
| 2020/0302185 A1* | 9/2020 | Hussein | G06N 3/084 |
| 2021/0124987 A1* | 4/2021 | Gan | G06V 10/764 |

OTHER PUBLICATIONS

Rahmad, Nur Azmina, et al. "A survey of video based action recognition in sports." Indonesian Journal of Electrical Engineering and Computer Science 11.3 (2018): 987-993.*

Wu, Fei, et al. "A survey on video action recognition in sports: Datasets, methods and applications." IEEE Transactions on Multimedia 25 (2022): 7943-7966.*

Jeff Donahue et al., "Long-term recurrent convolutional networks for visual recognition and description," 2015 IEEE Conference on Computer Vision and Pattern Recognition (CVPR), Boston, MA, USA, Jun. 2015, pp. 2625-2634, doi: 10.1109/CVPR.2015.7298878. (Cited in the specification on p. 2, lines 7 to 20).

Anthony Cioppa et al., "A Context-Aware Loss Function for Action Spotting in Soccer Videos," 2020 IEEE/CVF Conference on Computer Vision and Pattern Recognition (CVPR), Seattle, WA, USA, Jun. 2020, pp. 13123-13133, doi: 10.1109/CVPR42600.2020.01314.

* cited by examiner

ESTIMATION RESULT (a) GOAL SCENE (b) CARD SCENE

COMPUTER VISION SYSTEM, COMPUTER VISION METHOD, COMPUTER VISION PROGRAM, AND LEARNING METHOD

CROSS REFERENCE TO RELATED APPLICATIONS

This application is a National Stage of International Application No. PCT/JP2022/014991 filed on Mar. 28, 2022. The contents of the above document are incorporated herein by reference in its entirety.

TECHNICAL FIELD

The present disclosure relates to a computer vision system, a computer vision method, a computer vision program, and a learning method.

BACKGROUND ART

Hitherto, there has been known a technology which uses a machine learning model to estimate a scene type relating to a portion of a sports match video. Using this technology enables goal scenes, substitution scenes, and card scenes to be extracted from a soccer match video, for example, and as a result it becomes easier to edit the match video, for example, to create a highlights video.

In order to accurately estimate the scene type of a portion of a sports match video, it is important to use a machine learning model which takes into account a correlation between a plurality of pieces of image data forming the portion. In sports match videos, important scenes are often sparsely distributed across the overall video. Taking a soccer match as an example, on average there are only two to three goals scored during a 90-minute match. Thus, if whether or not the portion is of a goal scene is estimated based only on image data of a ball being kicked toward the goal, the estimation result is likely to be incorrect. Accordingly, in order to more reliably determine whether or not the portion is of a goal scene, it is important to consider other related image data as well, such as image data of the ball causing the net to move, or image data of players and spectators celebrating.

Hitherto, a recurrent neural network (RNN) has been known as a machine learning model which performs an estimation by taking into account a correlation between pieces of input data. For example, in Non-Patent Literature 1, there is described a method of estimating a scene type relating to a moving image by using a long short-term memory (LSTM), which is a type of RNN.

CITATION LIST

Non Patent Literature

[NPL 1] Jeff Donahue, Lisa Anne Hendricks, Sergio Guadarrama, Marcus Rohrbach, Subhashini Venugopalan, Kate Saenko, and Trevor Darrell, "Long-term recurrent convolutional networks for visual recognition and description." In Proceedings of the IEEE conference on Computer Vision and Pattern Recognition, 2015. pp. 2,625-2,634.

SUMMARY OF INVENTION

Technical Problem

In the method of estimating the scene type by using RNN, processing is sequentially performed on consecutive data input in time series, and thus gradient vanishing tends to occur during learning.

An object of the present disclosure is to provide a computer vision system including a machine learning model which estimates the scene type relating to a portion of a sports match video and is less likely to give rise to gradient vanishing during learning.

Solution to Problem

According to one embodiment of the present disclosure, there is provided a computer vision system including: a consecutive image data acquisition unit configured to acquire, from a sports match video, a plurality of pieces of consecutive image data indicating a portion of the sports match video, the plurality of pieces of consecutive image data including a plurality of pieces of first consecutive image data that are consecutive; and a machine learning model configured to estimate whether the portion is of a predetermined scene type, the machine learning model including: a first feature acquisition unit configured to acquire, from the plurality of pieces of first consecutive image data, a plurality of first features each corresponding to one piece of the plurality of pieces of first consecutive image data and each indicating a feature of the one piece of the plurality of pieces of first consecutive image data; a second feature acquisition unit configured to acquire a plurality of second features from the plurality of first features by calculating a plurality of first salience degrees each corresponding to one of the plurality of first features and each indicating saliency of the one of the plurality of first features, and weighting each of the plurality of first features by corresponding one of the plurality of first salience degrees; and an estimation result acquisition unit configured to acquire a result of the estimation based on the plurality of second features.

DESCRIPTION OF EMBODIMENTS

Description is now given of an example of an embodiment of a computer vision system according to the present disclosure. In this embodiment, a case in which the computer vision system is implemented by one computer is described, but the computer vision system may be implemented by a plurality of computers.

[1. Overall Configuration of Computer Vision System]

Figure 1:
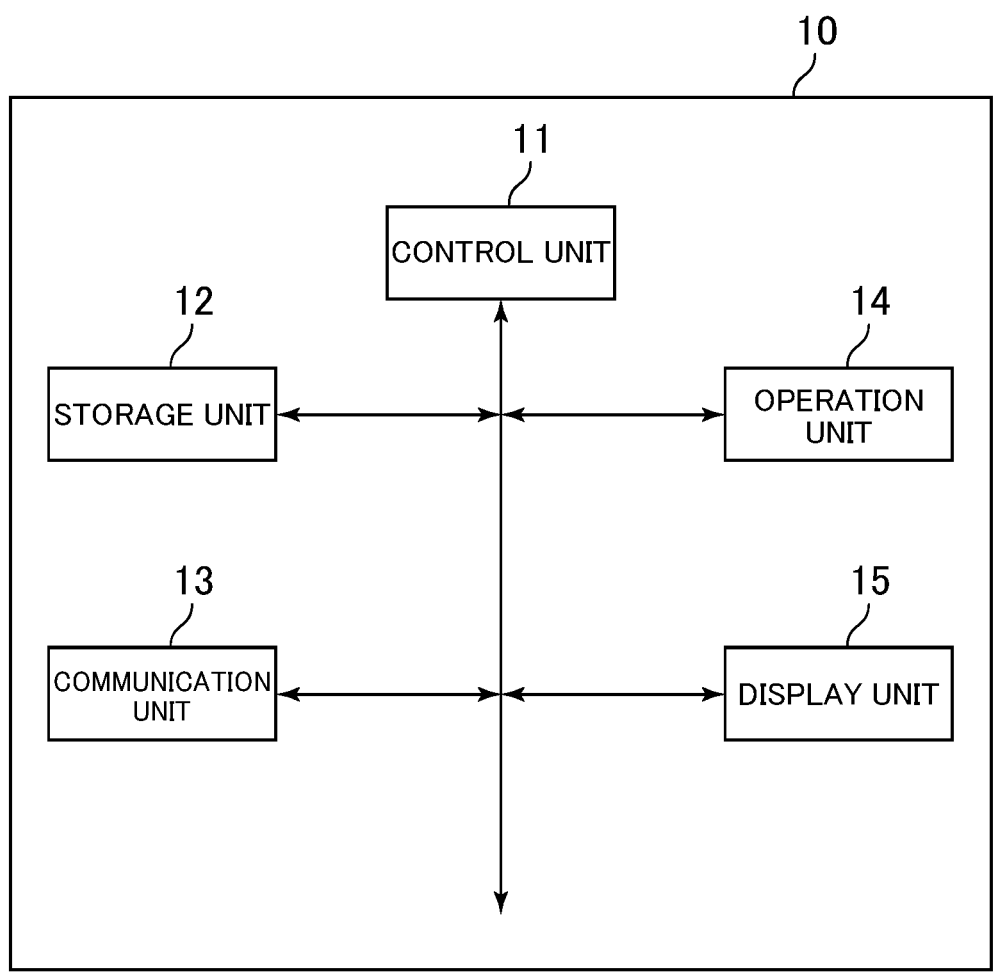
FIG. 1 is a diagram for illustrating a hardware configuration of a computer vision system according to the present disclosure.

FIG. 1 is a diagram for illustrating a hardware configuration of a computer vision system according to the present disclosure. A computer vision system 10 is, for example, a mobile phone (including a smartphone), a personal digital assistant (including a tablet-type computer), a personal computer, a server computer, or the like. As illustrated in FIG. 1, the computer vision system 10 includes a control unit 11, a storage unit 12, a communication unit 13, an operation unit 14, and a display unit 15.

The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory such as a RAM, and the auxiliary memory unit is a non-volatile memory such as a ROM, an EEPROM, a flash memory, or a hard disk drive. The communication unit 13 is a communication interface for wired communication or wireless communication, and performs data communication via a network such as the Internet.

The operation unit 14 is an input device. The operation unit 14 is, for example, a touch panel, a pointing device such as a mouse, a keyboard, buttons, or the like. The operation unit 14 transmits content of an operation by the user to the control unit 11.

The display unit 15 is a display device. The display unit 15 is, for example, a liquid crystal display unit, an organic EL display unit, or the like. The display unit 15 displays images in accordance with instructions from the control unit 11.

Programs and data described as being stored into the storage unit 12 may be supplied thereto via the network. Further, the hardware configuration of each computer described above is not limited to the above-mentioned example, and various types of hardware can be applied thereto. For example, the hardware configuration may include a reading unit (e.g., an optical disc drive or a memory card slot) for reading a computer-readable information storage medium, and an input/output unit (e.g., a USB port) for inputting and outputting data to/from an external device. For instance, the program and the data that are stored on the information storage medium may be supplied to each computer via the reading unit or the input/output unit.

[2. Functions Implemented in Computer Vision System]

Figure 2:
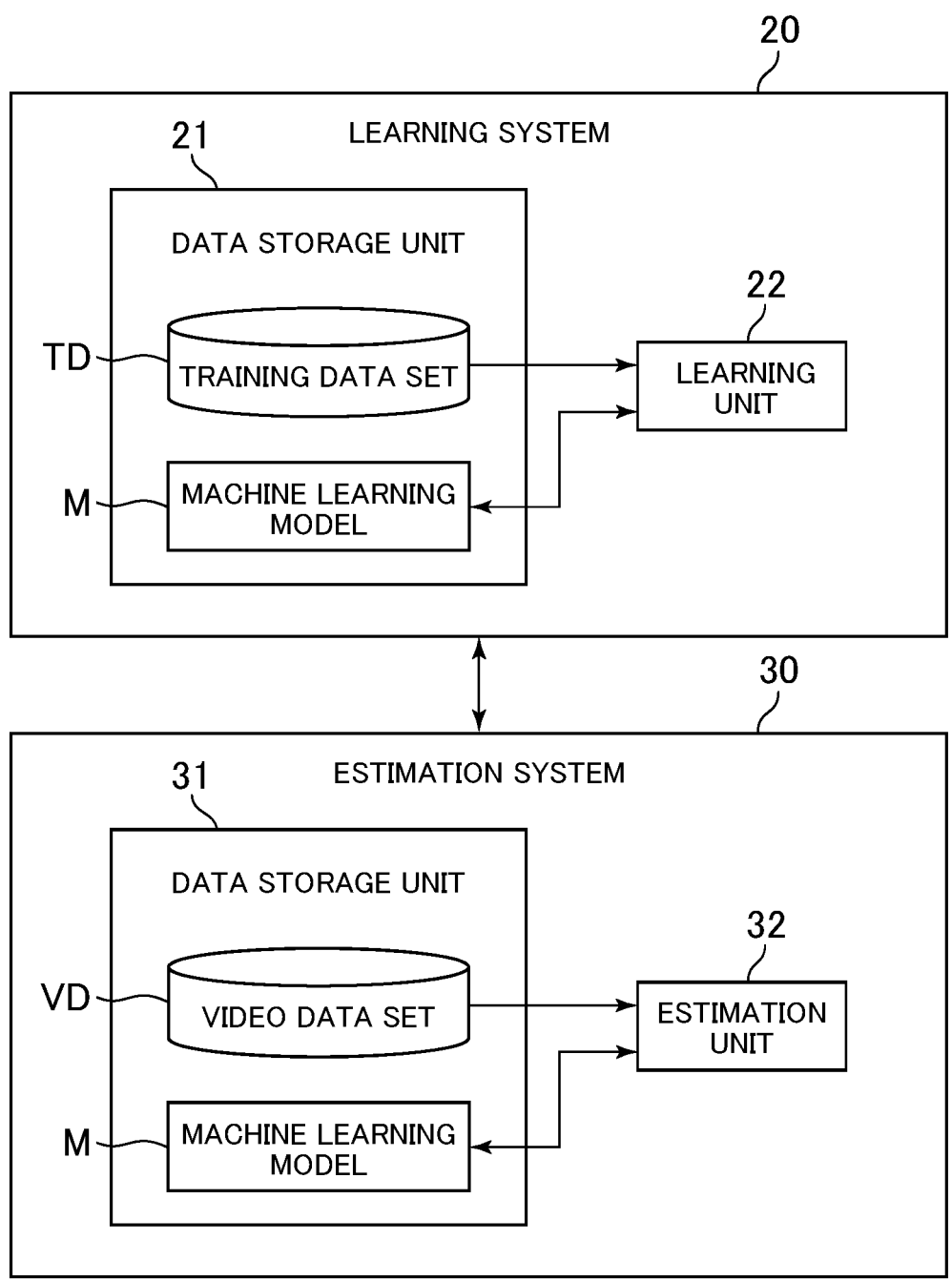
FIG. 2 is a function block diagram for illustrating an example of functions implemented in the computer vision system according to the present disclosure.

FIG. 2 is a function block diagram for illustrating an example of functions implemented in the computer vision system according to the present disclosure. The computer vision system 10 includes a learning system 20 and an estimation system 30. The functions of the learning system 20 and the functions of the estimation system 30 are each implemented by the hardware illustrated in FIG. 1. Further, the functions of the learning system 20 and the functions of the estimation system 30 are implemented by executing a learning program and an estimation program relating to this embodiment with the above-mentioned hardware. Those programs may be stored in a computer-readable storage medium such as a semiconductor memory, and supplied to the above-mentioned hardware from the medium.

[2-1. Functions Implemented in Learning System]

The functions implemented in the learning system 20 are now described. In the learning system 20, a data storage unit 21 and a learning unit 22 are implemented. The data storage unit 21 is mainly implemented by the storage unit 12, and the learning unit 22 is mainly implemented by the control unit 11. Description is now given of the data storage unit 21 and the learning unit 22.

[Data Storage Unit]

The data storage unit 21 stores the data required for the processing by the learning unit 22. Specifically, the data storage unit 21 stores a machine learning model M. More specifically, the data storage unit 21 stores the program (algorithm) and parameters, for example, of the machine learning model M to be used in the estimation system 30. The machine learning model M is trained by the learning unit 22, and then transmitted to the estimation system 30. Further, the data storage unit 21 stores a training data set TD. The training data set TD stores a plurality of pairs of a plurality of pieces of training consecutive image data TCD and label data. In this embodiment, the plurality of pieces of training consecutive image data TCD indicate an estimated portion P, which is a portion of a sports match video V. The label data is associated with the plurality of pieces of training consecutive image data TCD, and indicates a scene type relating to the plurality of pieces of training consecutive image data TCD.

Figure 3:
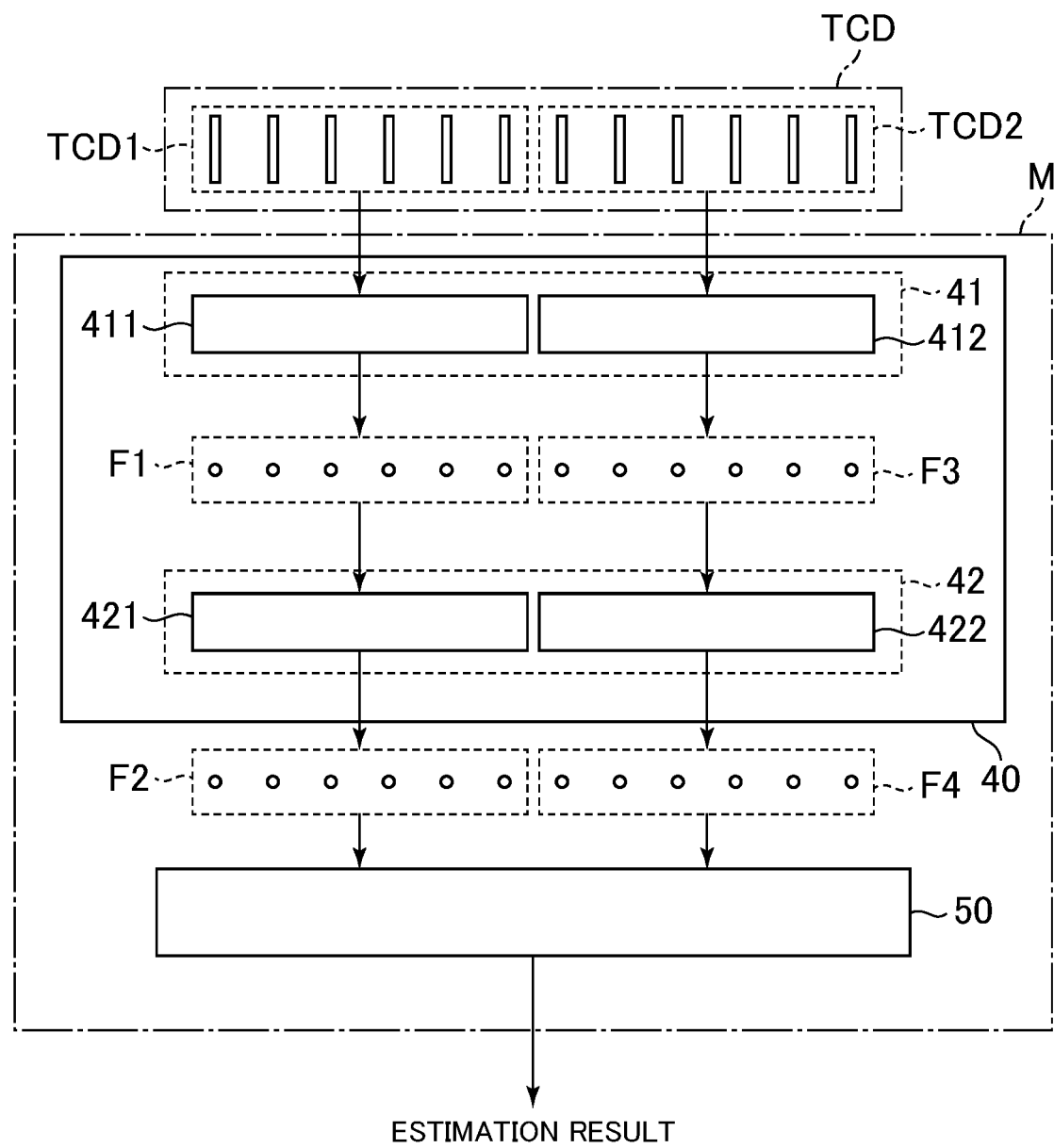
FIG. 3 is a diagram for illustrating an example of a detailed configuration of a machine learning model.
Figure 5:
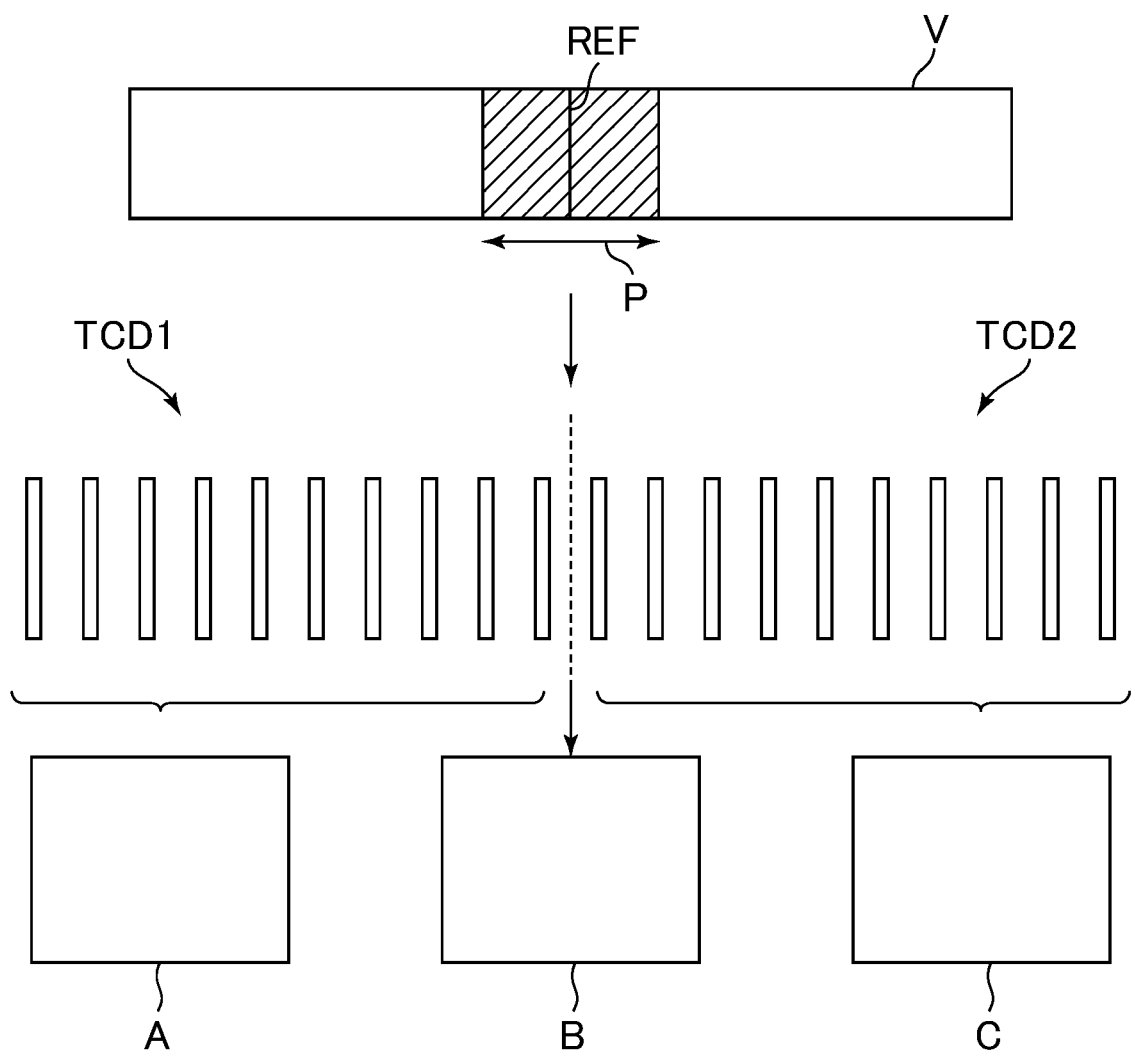
FIG. 5 is a diagram for illustrating an example of a detailed configuration of training consecutive image data.
Figure 6:
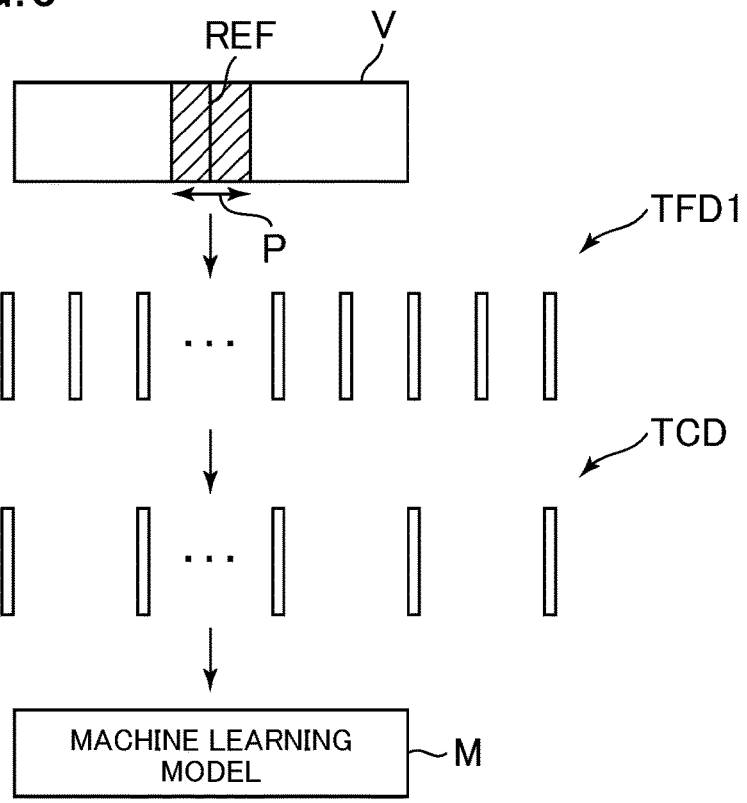
FIG. 6 are diagrams for illustrating an example of details of processing executed by a learning unit.
Figure 6:
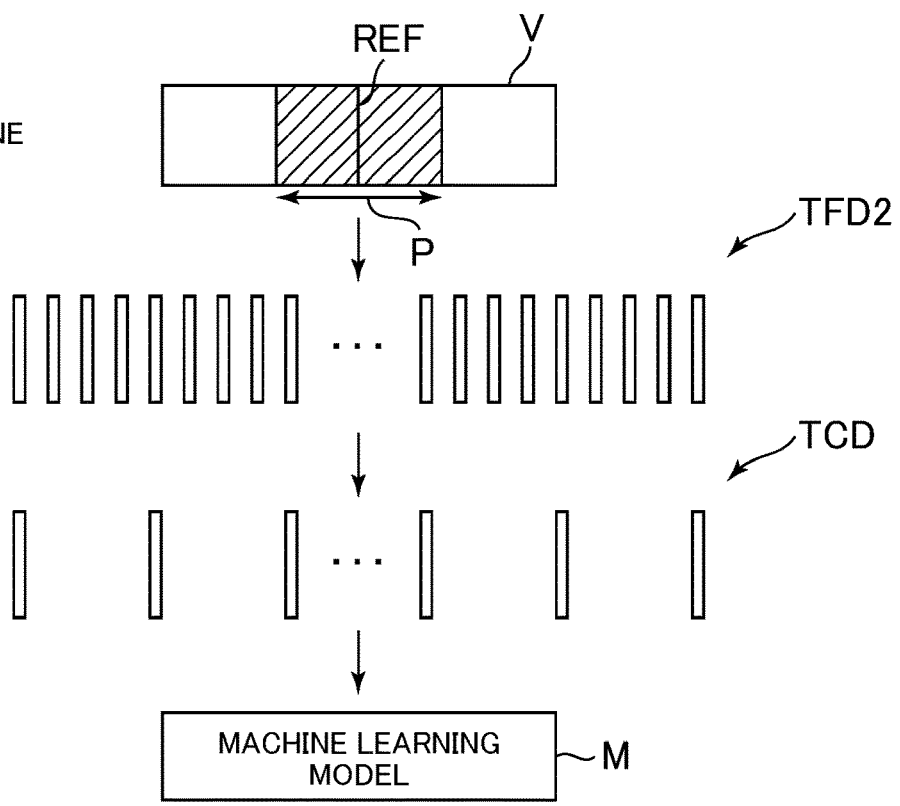

An overview of the plurality of pieces of training consecutive image data TCD is now given with reference to FIG. 3, FIG. 5, and FIG. 6 as appropriate. The estimated portion P indicated by the plurality of pieces of training consecutive image data TCD indicates a portion before and after a predetermined time (hereinafter referred to as "reference time REF") of the entire match video V (refer to FIG. 5 and FIG. 6). For example, when the reference time REF is the "t-th" second of the match video V and the length of the estimated portion P is 120 seconds, the estimated portion P indicates the portion from t−60 seconds to t+60 seconds of the entire match video V. As described later, the length of the estimated portion P differs depending on the scene type of the estimated portion P.

The plurality of pieces of training consecutive image data TCD are consecutive pieces of image data forming moving image data relating to the estimated portion P, and are equal in number to the number of pieces of the training consecutive image data TCD input to the machine learning model M. In this embodiment, a case in which the training consecutive image data TCD is expressed in a vector format is described. When the training consecutive image data TCD is expressed in a vector format, the number of dimensions of the training consecutive image data TCD is equal to a resolution value (H×W×C) of the original image of the training consecutive image data TCD. The training consecutive image data TCD can be expressed in any format, and is not limited to a vector format. The training consecutive image data TCD can be expressed in other formats such as an array format, a matrix format, or a single numerical value.

More specifically, the plurality of pieces of training consecutive image data TCD include a plurality of pieces of first-half training consecutive image data TCD1 (first training consecutive image data) that are consecutive and a plurality of pieces of second-half training consecutive image data TCD2 (second training consecutive image data) that are consecutive after the plurality of pieces of first-half training consecutive image data TCD1 (refer to FIG. 3). In this embodiment, the number of pieces of the first-half training consecutive image data TCD1 is equal to the number of pieces of the second-half training consecutive image data TCD2. In this embodiment, a case in which the plurality of pieces of training consecutive image data TCD are divided into two, that is, the plurality of pieces of first-half training consecutive image data TCD1 and the plurality of pieces of second-half training consecutive image data TCD2, is described, but the plurality of pieces of training consecutive image data TCD may be divided into three or more. Further, the number of pieces of the first-half training consecutive image data TCD1 is not required to be the same as the number of pieces of the second-half training consecutive image data TCD2.

[Machine Learning Model]

The specific configuration of the machine learning model M is now described with reference to FIG. 3. FIG. 3 is a diagram for illustrating an example of a detailed configuration of the machine learning model. The machine learning model M estimates whether or not the estimated portion P is of a predetermined scene type.

The machine learning model M in this embodiment executes the estimation based on information on a correlation between the plurality of pieces of consecutive image data, without relying on sequential processing such as RNN. Thus, in the machine learning model M in this embodiment, gradient vanishing is less likely to occur during learning.

Further, the machine learning model M in this embodiment can more efficiently estimate the scene type of the estimated portion P of the sports match video V. That is, in the sports match video V, the features of consecutive image data CD often significantly change before and after an event, and thus estimation efficiency can be improved by performing a separate determination before and after the event. In this regard, with the machine learning model M in this embodiment, because separate determinations can be performed before and after the event, estimation of the scene type can be executed more efficiently.

Specifically, the machine learning model M includes a feature acquisition unit 40 and an estimation result acquisition unit 50. The feature acquisition unit 40 further includes an image feature extraction unit 41 and a salience degree weighting unit 42. Description is now given of the feature acquisition unit 40 (image feature extraction unit 41 and salience degree weighting unit 42) and the estimation result acquisition unit 50.

The image feature extraction unit 41 includes a first-half image feature acquisition unit 411 (first feature acquisition unit) and a second-half image feature acquisition unit 412 (third feature acquisition unit). The first-half image feature acquisition unit 411 and the second-half image feature acquisition unit 412 are now described.

The first-half image feature acquisition unit 411 acquires from the plurality of pieces of first-half training consecutive image data TCD1 a plurality of first-half image features F1 (first features). Each first-half image feature F1 corresponds to one piece of the plurality of pieces of first-half training consecutive image data TCD1 and indicates a feature of the corresponding one piece of the plurality of pieces of first-half training consecutive image data TCD1. In this embodiment, the first-half image feature F1 is a vector. As the first-half image feature acquisition unit 411, for example, a fixed (a publicly-known trained) feature extractor such as ResNet-152 trained using ImageNet, can be used. Further, the first-half image feature acquisition unit 411 reduces the number of dimensions of the first-half image feature F1 so as to be smaller than the number of dimensions of the corresponding first-half training consecutive image data TCD1 by reducing dimensions using principal component analysis, for example. The first-half image feature F1 can be expressed in any format, and is not limited to a vector format. The first-half image feature F1 can be expressed in other formats such as an array format, a matrix format, or a single numerical value.

Similarly to the first-half image feature acquisition unit 411, the second-half image feature acquisition unit 412 acquires from the plurality of pieces of second-half training consecutive image data TCD2 a plurality of second-half image features F3 (third features). Each second-half image feature F3 corresponds to one piece of the plurality of pieces of second-half training consecutive image data TCD2 and indicates a feature of the corresponding one piece of the plurality of pieces of second-half training consecutive image data TCD2.

Figure 4:
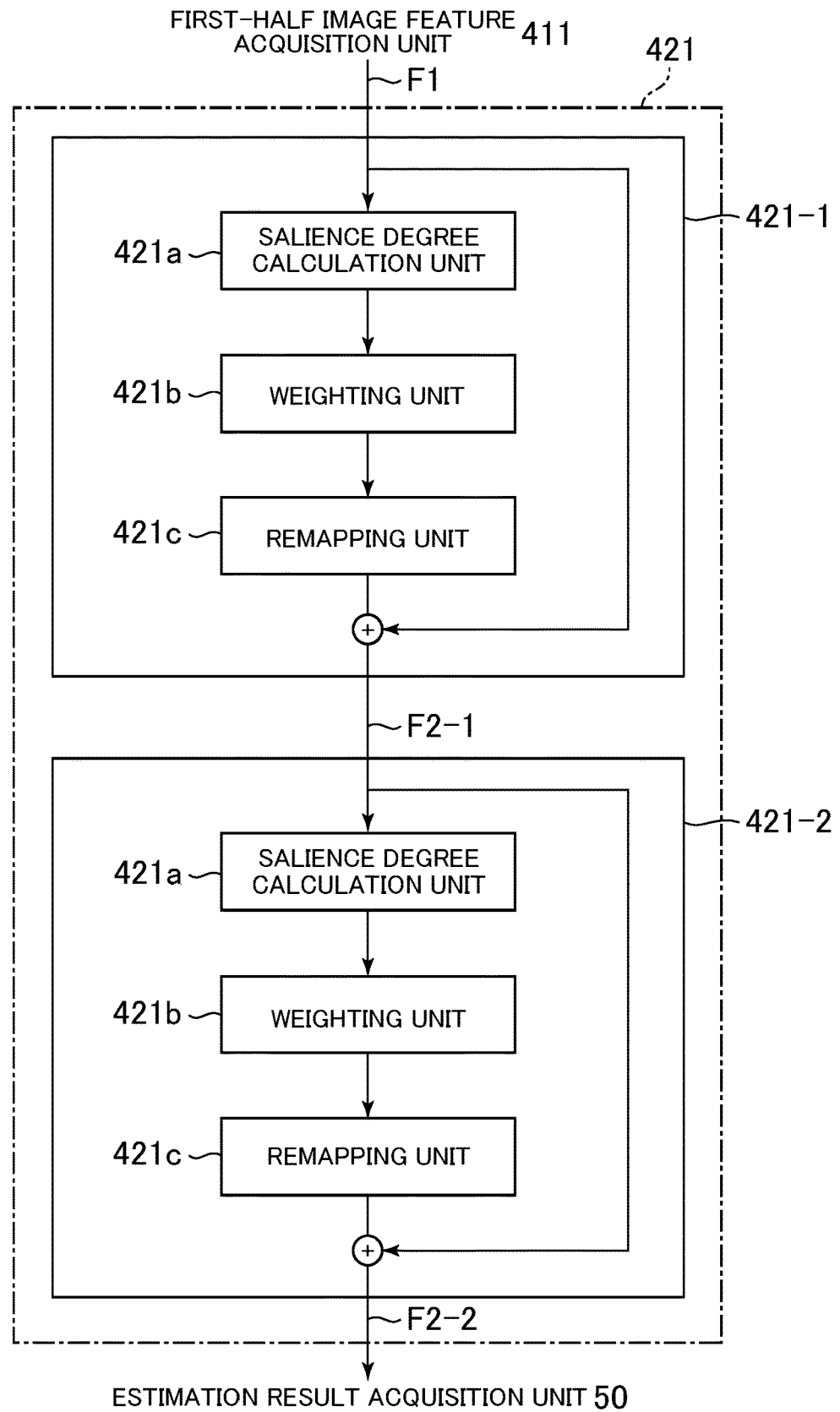
FIG. 4 is a diagram for illustrating an example of a detailed configuration of a salience-degree-weighted first-half feature acquisition unit.

The salience degree weighting unit 42 includes a salience-degree-weighted first-half feature acquisition unit 421 (second feature acquisition unit) and a salience-degree-weighted second-half feature acquisition unit 422 (fourth feature acquisition unit). Description is now given of the salience-degree-weighted first-half feature acquisition unit 421 and the salience-degree-weighted second-half feature acquisition unit 422 with reference to FIG. 4. FIG. 4 is a diagram for illustrating an example of a detailed configuration of the salience-degree-weighted first-half feature acquisition unit.

With the configuration illustrated in FIG. 4, the machine learning model M performs the estimation processing with more emphasis on the image features that are important for estimating the scene type, and thus the estimation processing can be executed efficiently. The estimated portion P of the match video V includes many consecutive images that are similar to each other. Much of the information included in those consecutive images is not particularly important for the estimation processing by the machine learning model M. Thus, the machine learning model M can, by taking the features relating to a large number of consecutive images that are similar to each other (that is, having a low salience degree) to be of low importance and reducing the contribution of those features in the estimation processing, execute the estimation processing efficiently.

Specifically, the salience-degree-weighted first-half feature acquisition unit 421 acquires a plurality of salience-degree-weighted first-half features F2 (second features) from the plurality of first-half image features F1. The salience-degree-weighted first-half feature acquisition unit 421 includes a salience degree calculation unit 421a, a weighting unit 421b, and a remapping unit 421c.

The salience degree calculation unit 421a calculates a plurality of first-half salience degrees (first salience degrees) each corresponding to one of the plurality of first-half image features F1 (first features) and each indicating the salience degree of the corresponding first-half image feature F1. Specifically, the salience degree calculation unit 421a calculates the first-half salience degrees based on a similarity between the plurality of first-half image features F1. More specifically, the salience degree calculation unit 421a calculates, for each of the plurality of first-half image features F1, a first-half salience degree based on the similarity between the first-half image feature F1 and each of the plurality of the first-half image features F1.

The salience degree calculation unit 421a calculates a similarity between the plurality of first-half image features F1, and calculates the first-half salience degree based on the similarity. In this embodiment, the first-half image feature F1 is a vector, and thus the similarity ($s_{i,j}$) between an i-th first-half image feature F1 and a j-th first-half image feature F1 is expressed as a cosine similarity as shown in Equation 1 below. In Equation 1, $f_i$ is the normalized i-th first-half image feature F1, and $f_j$ is the normalized j-th first-half image feature F1.

$$s_{i,j} = f_i^T f_j \qquad \text{[Equation 1]}$$

The weighting unit 421b weights each of the plurality of first-half image features F1 by the corresponding first-half salience degree. Specifically, when the value indicating the cumulative similarity between a certain first-half image feature F1 and the other first-half image features F1 is smaller, the weighting unit 421b gives a larger weight to that certain first-half image feature F1. More specifically, in this embodiment, the i-th weighted plurality of first-half image features F1 ($k_i$) are expressed by Equation 2 below. In Equation 2, $N_f$ is the number of first-half image features F1, and $\theta$ is a predetermined threshold value. As a matter of course, the method of weighting the first-half image features F1 by the first-half salience degree (that is, the format for expressing the first-half salience degree) is not limited to the format shown by Equation 2.

$$k_i = \sum_{j=1}^{N_f} \frac{e^{-(s_{i,j}-\theta)}}{\sum_{m=1}^{N_f} e^{-s_{m,j}}} f_i \qquad \text{[Equation 2]}$$

The above-mentioned salience degree calculation unit 421a and the above-mentioned weighting unit 421b in the machine learning model M in this embodiment are fixed converters that are not trained by the learning system 20. That is, in the machine learning model M in this embodiment, only the remapping unit 431c and the estimation result acquisition unit 50, which are described later, are trained by the learning system 20, and so the amount of training can be reduced.

The remapping unit 421c acquires a plurality of salience-degree-weighted first-half features F2 from the plurality of first-half image features F1 each weighted by the weighting unit 421b. In this embodiment, the remapping unit 421c includes two fully connected neural networks and a ReLu layer following the neural networks. The weights of those neural network are parameters learned in the learning system 20.

In this embodiment, the salience-degree-weighted first-half feature acquisition unit 421 has a configuration in which a residual connection is introduced from before the salience degree calculation unit 421a to after the remapping unit 421c. Further, in this embodiment, the salience-degree-weighted first-half feature acquisition unit 421 has a configuration in which normalization processing is performed before the salience degree calculation unit 421a and between the weighting unit 421b and the remapping unit 421c (not shown).

Further, in more detail, the salience-degree-weighted first-half feature acquisition unit 421 is a plurality of salience-degree-weighted first-half feature acquisition units 421 including a first salience-degree-weighted first-half feature acquisition unit 421-1 and a second salience-degree-weighted first-half feature acquisition unit 421-2. Further, the plurality of salience-degree-weighted first-half features F2 include a plurality of first salience-degree-weighted first-half features F2-1 and a plurality of second salience-degree-weighted first-half features F2-2. Specifically, the first salience-degree-weighted first-half feature acquisition unit 421-1 acquires the plurality of first salience-degree-weighted first-half features F2-1 by using the plurality of first-half image features F1 as inputs. Further, the second salience-degree-weighted first-half feature acquisition unit 421-2 acquires the plurality of second salience-degree-weighted first-half features F2-2 by using the plurality of first salience-degree-weighted first-half features F2-1 as inputs.

In other words, the salience-degree-weighted first-half feature acquisition unit 421 has a configuration in which a set of a salience degree calculation unit 421a, a weighting unit 421b, and a remapping unit 421c are connected in series in multiple stages. Here, a case has been described in which the set of the salience degree calculation unit 421a, the weighting unit 421b, and the remapping unit 421c are connected in two stages, but the set of the salience degree calculation unit 421a, the weighting unit 421b, and the remapping unit 421c may be connected in three stages or more. With this configuration, the salience degree between features can be extracted with higher accuracy.

Similarly to the salience-degree-weighted first-half feature acquisition unit 421, the salience-degree-weighted second-half feature acquisition unit 422 acquires a plurality of salience degree-weighted second-half features F4 (fourth features) from the plurality of second-half image features F3.

The estimation result acquisition unit 50 acquires an estimation result based on the plurality of salience-degree-weighted first-half features F2 and the plurality of salience degree-weighted second-half features F4. Specifically, the estimation result acquisition unit 50 is an estimator which performs an estimation based on input data. For example, the estimation result acquisition unit 50 is a fully connected neural network, and the weight of the estimation result acquisition unit 50 is a parameter to be learned in the learning system 20. As the estimation result, the estimation result acquisition unit 50 outputs a value of the probability that the estimated portion P is of the predetermined scene type.

The configuration of the machine learning model M is not limited to the example described in this embodiment. In the machine learning model M in a modification example, a configuration may be adopted in which the image feature extraction unit 41 does not include the first-half image feature acquisition unit 411 and the second-half image feature acquisition unit 412, and the salience degree weighting unit 42 does not include the salience-degree-weighted first-half feature acquisition unit 421 and the salience-degree-weighted second-half feature acquisition unit 422. The plurality of pieces of training consecutive image data TCD input to the machine learning model in the modification example do not include the plurality of pieces of first-half training consecutive image data TCD1 and the plurality of pieces of second-half training consecutive image data TCD2. That is, unlike the machine learning model M illustrated in FIG. 3, the machine learning model M in the modification example may have a configuration in which determinations are not performed separately before and after an event.

[Learning Unit]

The learning unit 22 trains the machine learning model M by using a plurality of pieces of training consecutive image data TCD. Specifically, the learning unit 22 acquires a plurality of pieces of training consecutive image data TCD and label data, inputs the plurality of pieces of training consecutive image data TCD into the machine learning model M, acquires the result of the estimation of the scene type relating to the plurality of pieces of training consecutive image data TCD, and trains the machine learning model M based on the estimation result and the label data. More specifically, the learning unit 22 trains the machine learning model so that the probability value of the label relating to the label data becomes larger. When the value has become sufficiently large during the training, the learning unit 22 ends the training at that point. The learning unit 22 may end the training in a case in which the training has been repeated a predetermined number of times even when the value has not become sufficiently large. For the training itself, a publicly-known method can be used. For example, Adam, RMSProp, or the like may be used.

[Details of Training Consecutive Image Data]

Description is now given of a detailed configuration of the training consecutive image data TCD (in particular, first-half training consecutive image data TCD1 and second-half training consecutive image data TCD2) used for learning with reference to FIG. 5. FIG. 5 is a diagram for illustrating an example of a detailed configuration of training consecutive image data.

The machine learning model M can be trained efficiently by using the training consecutive image data TCD having the configuration described below. That is, with the configuration described below, the learning can be performed by using the plurality of pieces of training consecutive image data TCD, which are optimal for each of the salience-degree-weighted first-half feature acquisition unit 421 and the salience-degree-weighted second-half feature acquisition unit 422, and thus the machine learning model M can be trained efficiently.

Specifically, the plurality of pieces of first-half training consecutive image data TCD1 correspond to before an event characterizing the scene type relating to the plurality of pieces of training consecutive image data TCD, and the plurality of pieces of second-half training consecutive image data TCD2 correspond to after the event. Here, the event corresponds to the reference time REF, the plurality of pieces of first-half training consecutive image data TCD1 correspond to the portion before the reference time REF in the match video V, and the plurality of pieces of second-half training consecutive image data TCD2 correspond to the portion after the reference time REF in the match video V.

In this embodiment, the match video V is a soccer match video, and the scene type relating to the plurality of pieces of training consecutive image data TCD is a goal scene. In this example, it is assumed that the plurality of pieces of training consecutive image data TCD are formed from a scene A in which players are running towards the goal, a scene B in which a player is taking a shot at the goal, and a scene C in which the players are running around and celebrating. Here, the scene A, the scene B, and the scene C are arranged in time series in the stated order. In this case, an event characterizing the goal scene is the scene B, the plurality of pieces of first-half training consecutive image data TCD1 correspond to the scene A, and the plurality of pieces of second-half training consecutive image data TCD2 correspond to the scene C.

[Details of Processing Executed by Learning Unit]

Next, details of processing executed by the learning unit are described with reference to FIG. 6. FIG. 6 are diagrams for illustrating an example of the details of the processing executed by the learning unit.

More specifically, the machine learning model M estimates which of a plurality of scene types including a first scene type and a second scene type the estimated portion P is. In this embodiment, a case in which the plurality of scene types is two scene types, namely, the first scene type and the second scene type, is described, but the plurality of scene types may be three or more scene types. The number of scene types is not limited to a plurality of scene types, and may be one scene type. In this embodiment, a case in which the first scene type is a goal scene and the second scene type is a card scene is described. As a matter of course, the first scene type and the second scene type are not limited to this example.

With the processing by the learning unit illustrated in FIGS. 6, regardless of the length of the estimated portion P, the machine learning model M can be trained by using the same small number of pieces of the training consecutive image data TCD. Taking a soccer match video as an example, a video portion showing a card scene is often longer than a video portion showing a goal scene. That is, the length of an estimated portion P showing a card scene is different from the length of an estimated portion P showing a goal scene. Even when the length of the estimated portion P differs depending on the scene type as described above, with the processing by the learning unit illustrated in FIGS. 6, learning can be executed by using the same small number of pieces of the training consecutive image data TCD.

Specifically, the learning unit 22 acquires first training frame image data TFD1 indicating the estimated portion P from the match video V (FIG. 6(a)). The number of pieces of the first training frame image data TFD1 corresponds to a goal scene. Similarly, the learning unit 22 acquires second training frame image data TFD2 indicating the estimated portion P from the match video V (FIG. 6(b)). The number of pieces of the second training frame image data TFD2 corresponds to a card scene. For example, when the number of pieces of the first training frame image data TFD1 corresponding to the goal scene is 60, the number of pieces of the second training frame image data TFD2 corresponding to the card scene is 90. As a matter of course, this is just an example, and the number of pieces of the first training frame image data TFD1 and the number of pieces of the second training frame image data TFD2 can be freely set.

The learning unit 22 acquires, from the first training frame image data TFD1, the same number of pieces of the training consecutive image data TCD relating to the goal scene as the number of pieces of the training consecutive image data TCD input to the machine learning model M (FIG. 6(a)). The number of pieces of the training consecutive image data TCD input to the machine learning model M is set in advance. Accordingly, when the number of pieces of the first training frame image data TFD1 is different from the number of pieces of the training consecutive image data TCD, it is not possible to directly input the first training frame image data TFD1 to the machine learning model M. Thus, the learning unit 22 performs resampling on the first training frame image data TFD1, and acquires the same number of pieces of the training consecutive image data TCD as the number of pieces of the training consecutive image data TCD input to the machine learning model M. Various interpolation methods can be used for the method for the resampling.

Further, in the same way as in the case of the training consecutive image data TCD relating to the goal scene, the learning unit 22 acquires, M from the second training frame image data TFD2 the same number of pieces of the training consecutive image data TCD relating to the card scene as the number of pieces of the training consecutive image data TCD input to the machine learning model (FIG. 6(b)).

Here, the training consecutive image data TCD relating to the goal scene is associated with first label data indicating the goal scene (FIG. 6(a)). Similarly, the training consecutive image data TCD relating to the card scene is associated with second label data indicating the card scene (FIG. 6(b)).

Then, the learning unit 22 inputs the plurality of pieces of training consecutive image data TCD relating to the goal scene to the machine learning model, and acquires the estimation result of the scene type relating to the training consecutive image data TCD. The learning unit 22 trains the machine learning model M based on the estimation result and the first label data (FIG. 6(a)). Similarly, the learning unit 22 inputs the plurality of pieces of training consecutive image data TCD relating to the card scene to the machine learning model, and acquires the estimation result of the scene type relating to the training consecutive image data TCD. The learning unit 22 trains the machine learning model M based on the estimation result and the second label data (FIG. 6(b)).

[2-2. Functions Implemented in Estimation System]

Referring back to FIG. 2, the functions implemented in the estimation system 30 are now described. In the estimation system 30, a data storage unit 31 and an estimation unit 32 are implemented. The data storage unit 31 is mainly implemented by the storage unit 12, and the estimation unit 32 is mainly implemented by the control unit 11. Description is now given of the data storage unit 31 and the estimation unit 32.

[Data Storage Unit]

The data storage unit 31 stores the data required for the processing by the estimation unit 32. Specifically, the data storage unit 31 stores a video data set VD. The video data set VD stores the data of the match video V. The match video V is a sports match video. In this embodiment, as described above, the sport relating to the match video V is soccer, but the sport is not limited to this example, and may be another ball game played by groups of people, such as baseball, rugby, or volleyball. Further, the sport relating to the match video V may be a ball game played by one person (including a pair of people), such as tennis, table tennis, or golf, a track and field event such as a full marathon, an aquatic event such as pool swimming or open water swimming, a snow event such as Nordic skiing, or an endurance event such as a triathlon or a bicycle road race. The data storage unit 31 stores the program (algorithm), and parameters, for example, of the machine learning model M. The parameters of the machine learning model M stored in the data storage unit 31 have been adjusted by the learning processing in the learning system 20.

[Estimation Unit]

Figure 7:
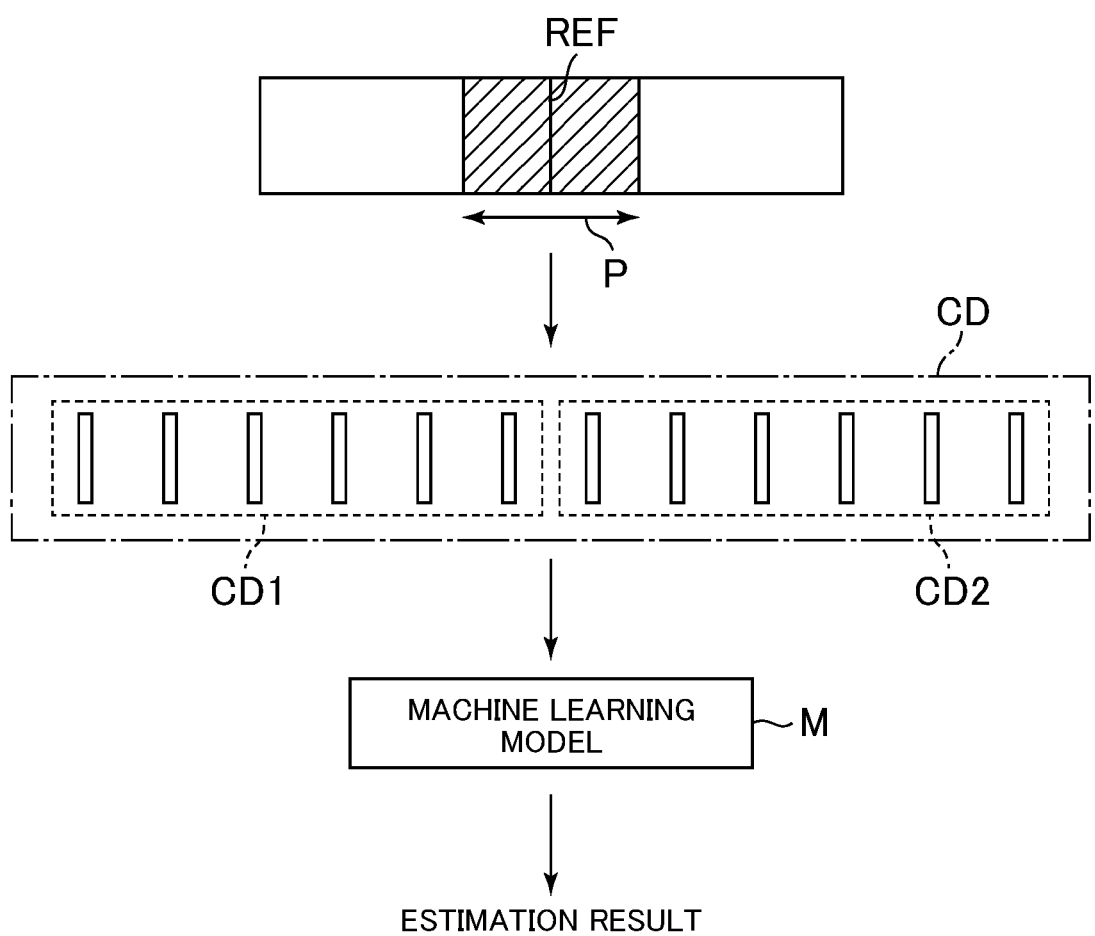
FIG. 7 is a diagram for illustrating an example of processing executed by an estimation unit.

The processing executed by the estimation unit 32 is now described with reference to FIG. 7. FIG. 7 is a diagram for illustrating an example of processing executed by the estimation unit. The estimation unit 32 uses the machine learning model M to estimate the scene type relating to the estimated portion P of the match video V.

The estimation unit 32 acquires a plurality of pieces of consecutive image data CD indicating the estimated portion P from the match video V. The plurality of pieces of consecutive image data CD are pieces of consecutive image data forming the estimated portion P, and are equal in number to the number of pieces of the consecutive image data CD input to the machine learning model M. In this embodiment, a case in which the consecutive image data CD is expressed in a vector format is described. When the consecutive image data CD is expressed in a vector format, the number of dimensions of the consecutive image data CD is equal to the resolution value (H×W×C) of the original image of the consecutive image data CD. The consecutive image data CD can be expressed in any format, and is not limited to a vector format. The consecutive image data CD can be expressed in other formats such as an array format, a matrix format, or a single numerical value.

Specifically, the plurality of pieces of consecutive image data CD include a plurality of pieces of first-half consecutive image data CD1 (first consecutive image data) that are consecutive and a plurality of pieces of second-half consecutive image data CD2 (second consecutive image data) that are consecutive after the plurality of pieces of first-half consecutive image data CD1. In this embodiment, the number of pieces of the first-half consecutive image data CD1 is equal to the number of pieces of the second-half consecutive image data CD2. In this embodiment, a case in which the plurality of pieces of consecutive image data CD are divided into two, that is, the plurality of pieces of first-half consecutive image data CD1 and the plurality of pieces of second-half consecutive image data CD2, is described, but the plurality of consecutive image data CD may be divided into three or more, or may not be divided. Further, the number of pieces of the first-half consecutive image data CD1 is not required to be the same as the number of pieces of the second-half consecutive image data CD2.

The estimation unit 32 inputs the plurality of pieces of consecutive image data CD into the machine learning model M, and estimates whether or not the estimated portion P is of a predetermined scene type as described with reference to FIG. 3.

[Details of Processing Executed by Estimation Unit]

Figure 8:
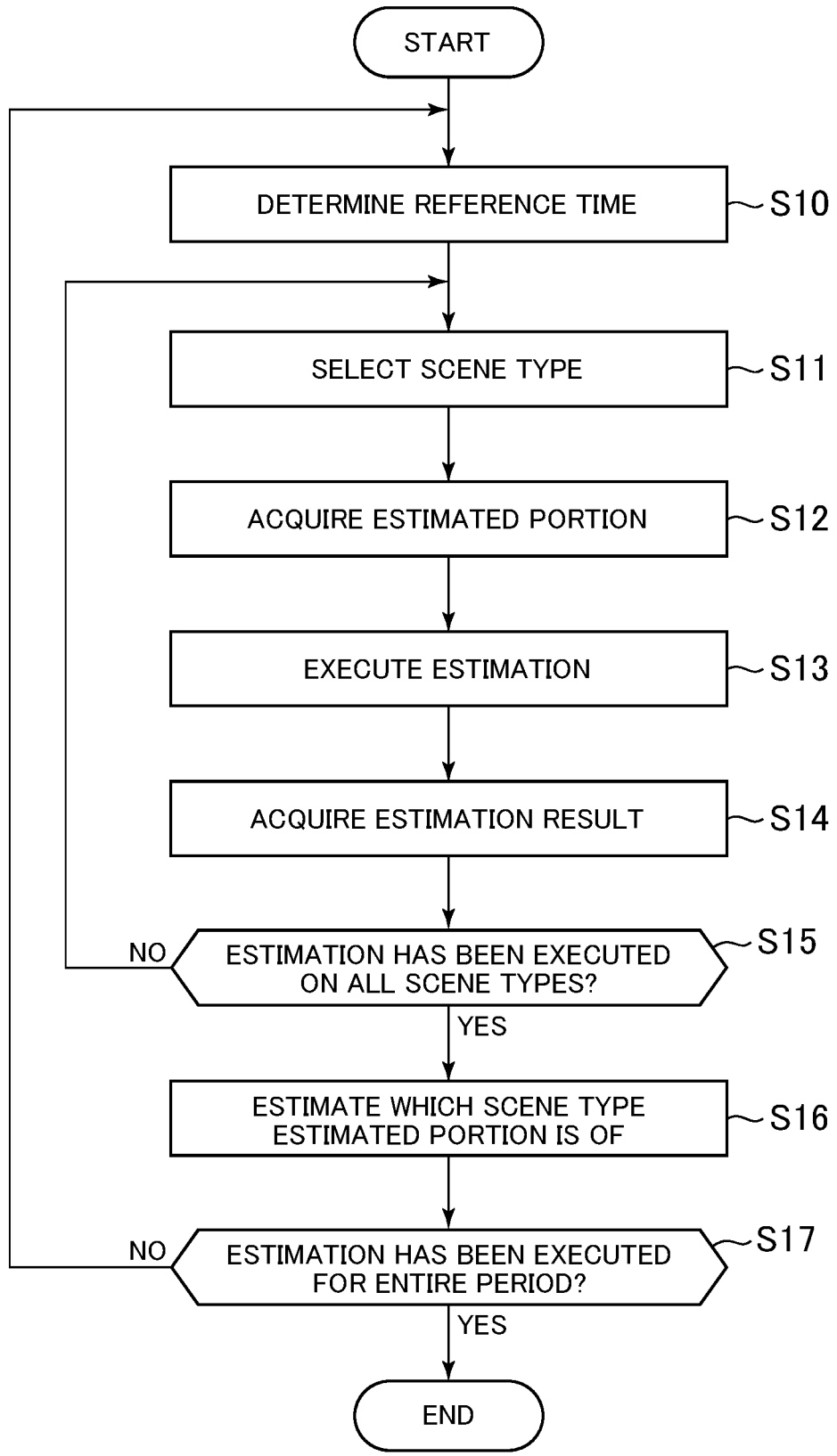
FIG. 8 is a flow chart for illustrating an example of details of processing executed by the estimation unit.

Finally, details of the processing executed by the estimation unit 32 are described with reference to FIG. 8. FIG. 8 is a flow chart for illustrating an example of details of processing executed by the estimation unit. The processing of each step illustrated in FIG. 8 is implemented by executing the estimation program with the hardware illustrated in FIG. 1.

With the configuration of the estimation unit 32 described below, a specific scene can be extracted from the match video V by using the machine learning model M in this embodiment. This configuration enables goal scenes, substitution scenes, and card scenes to be extracted from a soccer match video, for example, and as a result it becomes easier to edit the match video, for example, to create a highlights video.

Specifically, the estimation unit 32 sweeps the reference time REF over the entire match video V, and estimates which of the plurality of scene types the estimated portion P corresponding to each time in the match video V is.

First, the estimation unit 32 determines the reference time REF (Step S10). Specifically, the estimation unit 32 determines the reference time REF from each time in a period from the start time to the end time of the match video V. The start time is not required to match the actual start point of the match video (that is, 0 seconds). Similarly, the end time is not required to match the actual end point of the match video. This is to give consideration to the fact that the estimated portion P corresponding to the reference time REF is acquired in a later processing step.

Next, the estimation unit 32 selects the scene type to be estimated for the reference time REF from the plurality of scene types (Step S11). In this embodiment, a case in which the plurality of scene types are a goal scene (first scene type) and a card scene (second scene type) is described. As a matter of course, the number of the plurality of scene types may be three or more, and each scene type is not limited to this example.

The estimation unit 32 acquires the estimated portion P having the length corresponding to the selected scene type from the match video V (Step S12). Specifically, the estimation unit 32 acquires the plurality of pieces of frame image data, the number of pieces of the frame image data corresponding to the selected scene type, and acquires from the plurality of pieces of frame image data the same number of pieces of the consecutive image data CD as the number of pieces of the consecutive image data CD input to the machine learning model M by using a method similar to the processing illustrated in FIG. 6. More specifically, the estimation unit 32 acquires a plurality of pieces of first frame image data indicating the estimated portion P, the number of pieces of the first frame image data corresponding to the goal scene, and acquires from the plurality of pieces of first frame image data the same number of pieces of the consecutive image data CD relating the goal scene as the number of pieces of the consecutive image data CD input to the machine learning model M. The estimation unit 32 executes similar processing for the card scene.

Next, the estimation unit 32 estimates the scene type relating to the estimated portion P (Step S13). Specifically, the estimation unit 32 inputs the acquired consecutive image data CD to the machine learning model M, and acquires the estimation result of the scene type relating to the estimated portion P. The estimation unit 32 stores the acquired estimation result (Step S14).

The estimation unit 32 executes the processing steps of from Step S11 to Step S14 for both the goal scene and the card scene ("NO" in Step S15). When the estimation unit 32 finishes executing the processing steps of from Step S11 to Step S14 for both the goal scene and the card scene ("YES" in Step S15), the estimation unit 32 integrates the estimation results for each stored scene type, and acquires the stored estimation result as to whether the scene type relating to the estimated portion P is a goal scene or a card scene (Step S16).

The processing step of Step S16 is now described. Specifically, in the estimation unit 32, the machine learning model M acquires first determination data as to whether or not the estimated portion P is of a goal scene based on the consecutive image data CD relating to the goal scene. The first determination data is, specifically, a probability value, which is the result of the estimation relating to the goal scene. Similarly, the machine learning model M acquires second determination data as to whether or not the estimated portion P is of a card scene based on the consecutive image data CD relating to the card scene. The second determination data is, specifically, a probability value, which is the result of the estimation relating to the card scene.

Specifically, in the estimation unit 32, the machine learning model M acquires the estimation result regarding whether the scene type is a goal scene or a card scene based on the first determination data and the second determination data. More specifically, the machine learning model M determines whether or not the first determination data and the second determination data exceed a predetermined threshold value, and acquires the estimation result in accordance with the following determination. That is, when only one of the first determination data and the second determination data exceeds the threshold value, the machine learning model M determines that the scene type corresponding to the first or second determination data which exceeds the threshold value is the scene type relating to the estimated portion P. When the first determination data and the second determination data both do not exceed the threshold value, the machine learning model M determines that the scene type relating to the estimated portion P is neither a goal scene nor a card scene (that is, a background scene). When the first determination data and the second determination data both exceed the threshold value, the machine learning model M determines that the scene type corresponding to the first or second determination data having the larger value is the scene type relating to the estimated portion P.

The estimation unit 32 executes the processing steps of from Step S10 to Step S16 for all times in the period from the start time to the end time of the match video V ("NO" in Step S17). When the estimation unit 32 finishes executing the processing steps of from Step S10 to Step S16 for the entire period from the start time to the end time of the match video V ("YES" in S17), the estimation unit 32 ends the processing.

According to this embodiment described above, the computer vision system including the machine learning model which estimates the scene type of the portion of the sports match video and is less likely to give rise to gradient vanishing during learning is provided.

Further, the machine learning model in this embodiment gives consideration to the salience degree of each piece of consecutive image data forming a portion of the sports match video, and estimates the scene type relating to that portion. With the machine learning model in this embodiment, a feature weighted by a fixed converter that is not trained by the learning system in this embodiment is input to an estimator which is trained by the learning system in this embodiment, and therefore the training amount can be reduced.

The invention claimed is:

1. A computer vision system, comprising at least one processor configured to:
   acquire, from a sports match video, a plurality of pieces of consecutive image data indicating a portion of the sports match video, the plurality of pieces of consecutive image data including a plurality of pieces of first consecutive image data that are consecutive; and
   execute an estimation, by using a machine learning model, of whether the portion is of a predetermined scene type,
   wherein, in the estimation, the at least one processor is configured to:
      acquire, from the plurality of pieces of first consecutive image data, a plurality of first features each corresponding to one piece of the plurality of pieces of first consecutive image data and each indicating a feature of the one piece of the plurality of pieces of first consecutive image data;
      acquire a plurality of second features from the plurality of first features by calculating a plurality of first salience degrees each corresponding to one of the plurality of first features and each indicating saliency of the one of the plurality of first features, and weighting each of the plurality of first features by corresponding one of the plurality of first salience degrees; and
      acquire a result of the estimation based on the plurality of second features.

2. The computer vision system according to claim 1, wherein each of the plurality of first salience degrees is calculated based on a similarity between the plurality of first features.

3. The computer vision system according to claim 1, wherein the at least one processor is configured to:
   acquire a plurality of pieces of frame image data indicating the portion, a number of pieces of the frame image data to be acquired being different from a number of pieces of the consecutive image data; and
   acquire from the plurality of pieces of frame image data a same number of pieces of the consecutive image data as the number of pieces of the consecutive image data input to the machine learning model.

4. The computer vision system according to claim 1, wherein the plurality of pieces of consecutive image data further include a plurality of pieces of second consecutive image data that are consecutive after the plurality of pieces of first consecutive image data, wherein, in the estimation, the at least one processor is further configured to:

acquire, from the plurality of pieces of second consecutive image data, a plurality of third features each corresponding to one piece of the plurality of pieces of second consecutive image data and each indicating a feature of the one piece of the plurality of pieces of second consecutive image data; and acquire a plurality of fourth features from the plurality of third features by calculating a plurality of second salience degrees each corresponding to one of the plurality of third features and each indicating saliency of the one of the plurality of third features, and weighting each of the plurality of third features by corresponding one of the plurality of second salience degrees, and acquire the result of the estimation based on the plurality of second features and the plurality of fourth features.

5. The computer vision system according to claim 4, wherein a number of pieces of the first consecutive image data is equal to a number of pieces of the second consecutive image data.

6. The computer vision system according to claim 4, wherein the at least one processor is configured to estimate which of a plurality of scene types including a first scene type and a second scene type the portion is of, wherein the at least one processor is configured to:

acquire from the sports match video a plurality of pieces of first frame image data indicating the portion, a number of pieces of the first frame image data corresponding to the first scene type, and a plurality of pieces of second frame image data indicating the portion, a number of pieces of the second frame image data corresponding to the second scene type;

acquire from the plurality of pieces of first frame image data a same number of pieces of the consecutive image data relating to the first scene type as a number of pieces of the consecutive image data input to the machine learning model; and acquire from the plurality of pieces of second frame image data the same number of pieces of the consecutive image data relating to the second scene type as the number of pieces of the consecutive image data input to the machine learning model, and wherein, in the estimation, the at least one processor is configured to:

acquire first determination data as to whether the portion is of the first scene type based on the consecutive image data relating to the first scene type;

acquire second determination data as to whether the portion is of the second scene type based on the consecutive image data relating to the second scene type; and acquire the result of the estimation as to which of the plurality of scene types the portion is of based on the first determination data and the second determination data.

7. The computer vision system according to claim 4, wherein the machine learning model is generated by:

acquiring a plurality of pieces of training consecutive image data including a plurality of pieces of first training consecutive image data that are consecutive and a plurality of pieces of second training consecutive image data that are consecutive after the plurality of pieces of first training consecutive image data, and label data associated with the plurality of pieces of training consecutive image data, the label data indicating the scene type relating to the plurality of pieces of training consecutive image data;

inputting the plurality of pieces of training consecutive image data to the machine learning model and acquiring a result of an estimation of the scene type relating to the plurality of pieces of training consecutive image data; and training the machine learning model based on the result of the estimation and the label data.

8. The computer vision system according to claim 7, wherein the plurality of pieces of first training consecutive image data correspond to before an event characterizing the scene type relating to the plurality of pieces of training consecutive image data, and wherein the plurality of pieces of second training consecutive image data correspond to after the event.

9. A computer vision method, comprising:

acquiring, from a sports match video, a plurality of pieces of consecutive image data indicating a portion of the sports match video, the plurality of pieces of consecutive image data including a plurality of pieces of first consecutive image data that are consecutive; and executing an estimation, by using a machine learning model, of whether the portion is of a predetermined scene type, wherein the estimation comprises:

acquiring, from the plurality of pieces of first consecutive image data, a plurality of first features each corresponding to one piece of the plurality of pieces of first consecutive image data and each indicating a feature of the one piece of the plurality of pieces of first consecutive image data;

acquiring a plurality of second features from the plurality of first features by calculating a plurality of first salience degrees each corresponding to one of the plurality of first features and each indicating saliency of the one of the plurality of first features, and weighting each of the plurality of first features by corresponding one of the plurality of first salience degrees; and acquiring a result of the estimation based on the plurality of second features.

10. A non-transitory computer-readable information storage medium for storing a program for causing a computer to:

acquire, from a sports match video, a plurality of pieces of consecutive image data indicating a portion of the sports match video, the plurality of pieces of consecutive image data including a plurality of pieces of first consecutive image data that are consecutive; and execute an estimation, by using a machine learning model, of whether the portion is of a predetermined scene type, wherein the estimation further causing a computer to:

acquire, from the plurality of pieces of first consecutive image data, a plurality of first features each corresponding to one piece of the plurality of pieces of first consecutive image data and each indicating a feature of the one piece of the plurality of pieces of first consecutive image data;

acquire a plurality of second features from the plurality of first features by calculating a plurality of first salience degrees each corresponding to one of the plurality of first features and each indicating saliency of the one of the plurality of first features, and weighting each of the plurality of first features by corresponding one of the plurality of first salience degrees; and acquire a result of the estimation based on the plurality of second features.

11. A learning method for training a machine learning model configured to estimate whether a portion of a sports match video is of a predetermined scene type, based on a plurality of pieces of consecutive image data indicating the portion, the plurality of pieces of consecutive image data including a plurality of pieces of first consecutive image data that are consecutive and a plurality of pieces of second consecutive image data that are consecutive after the plurality of pieces of first consecutive image data, the learning method comprising:

acquiring a plurality of pieces of training consecutive image data including a plurality of pieces of first training consecutive image data that are consecutive and a plurality of pieces of second training consecutive image data that are consecutive after the plurality of pieces of first training consecutive image data, and label data associated with the plurality of pieces of training consecutive image data, the label data indicating the scene type relating to the plurality of pieces of training consecutive image data;

inputting the plurality of pieces of training consecutive image data to the machine learning model and acquiring a result of an estimation of the scene type relating to the plurality of pieces of training consecutive image data; and training the machine learning model based on the result of the estimation and the label data, wherein the estimation comprises:

acquiring from the plurality of pieces of first consecutive image data a plurality of first features each corresponding to one piece of the plurality of pieces of first consecutive image data and each indicating a feature of the one piece of the plurality of pieces of first consecutive image data;

acquiring a plurality of second features from the plurality of first features by calculating a plurality of first salience degrees each corresponding to one of the plurality of first features and each indicating saliency of the one of the plurality of first features, and weighting each of the plurality of first features by corresponding one of the plurality of first salience degrees;

acquiring from the plurality of pieces of second consecutive image data a plurality of third features each corresponding to one piece of the plurality of pieces of second consecutive image data and each indicating a feature of the one piece of the plurality of pieces of second consecutive image data;

acquiring a plurality of fourth features from the plurality of third features by calculating a plurality of second salience degrees each corresponding to one of the plurality of third features and each indicating saliency of the one of the plurality of third features, and weighting each of the plurality of third features by corresponding one of the plurality of second salience degrees; and acquiring a result of the estimation based on the plurality of second features and the plurality of fourth features.

12. The learning method according to claim 11, wherein the plurality of pieces of first training consecutive image data correspond to before an event characterizing the scene type relating to the plurality of pieces of training consecutive image data, and wherein the plurality of pieces of second training consecutive image data correspond to after the event.

* * * * *